US012646249B2

(12) United States Patent
Emberling et al.

(10) Patent No.: US 12,646,249 B2
(45) Date of Patent: *Jun. 2, 2026

(54) SYSTEM AND METHOD FOR EXECUTING A TASK

(71) Applicant: Advanced Micro Devices, Inc., Santa Clara, CA (US)

(72) Inventors: Brian Emberling, Santa Clara, CA (US); Michael Y. Chow, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/762,389

(22) Filed: Jul. 2, 2024

(65) Prior Publication Data

US 2024/0355044 A1 Oct. 24, 2024

Related U.S. Application Data

(63) Continuation of application No. 17/489,724, filed on Sep. 29, 2021, now Pat. No. 12,033,275.

(51) Int. Cl.
*G06T 15/80* (2011.01)
*G06F 9/50* (2006.01)

(52) U.S. Cl.
CPC ............ *G06T 15/80* (2013.01); *G06F 9/5016* (2013.01)

(58) Field of Classification Search
CPC ..... G06T 15/80; G06F 9/5016; G06F 9/5027; G06F 9/52; G06F 9/544; G06F 7/57; G06F 9/30036; G06F 9/3887
See application file for complete search history.

(56) References Cited

U.S. PATENT DOCUMENTS

| | | | |
|---|---|---|---|
| 10,831,490 B2 | 11/2020 | Jin | |
| 12,033,275 B2* | 7/2024 | Emberling | G06T 15/80 |

(Continued)

FOREIGN PATENT DOCUMENTS

KR 10-2018-0128075 A 11/2018

OTHER PUBLICATIONS

"Radeon RX 5700: Navi and the RDNA architecture, WikiChip Fuse", David Schor, Feb. 23, 2020. [Retrieved on Dec. 19, 2022] Retrieved from <URL: https://fuse.wikichip.org/news/3331/radeon-rx -5700-navi-and-the-rdna-architecture/2></URL:> pp. 1-2.

(Continued)

*Primary Examiner* — Chong Wu
(74) *Attorney, Agent, or Firm* — Volpe Koenig

(57) ABSTRACT

A method, system, and computer-readable medium for executing a task is disclosed. The method includes receiving input data and computing instructions, launching a workgroup including wavefronts to execute the task, wherein the launching causes the wavefronts to process the input data by sharing intermediate results and resources, and adjusting the operation based on characteristics of the wavefronts. The characteristics include data dependencies, computational load, memory usage, and execution timing requirements. The wavefronts execute the task in stages, where each stage processes portions of input data and data generated by other wavefronts.

20 Claims, 4 Drawing Sheets

100A

(56)         References Cited

U.S. PATENT DOCUMENTS

| | | | |
|---|---|---|---|
| 2013/0147816 A1* | 6/2013 | Hartog .................... | G06F 9/505 |
| | | | 345/503 |
| 2013/0155077 A1 | 6/2013 | Hartog et al. | |
| 2019/0034151 A1 | 1/2019 | Dutu et al. | |
| 2019/0155604 A1 | 5/2019 | Emberling et al. | |
| 2019/0332420 A1 | 10/2019 | Ukidave et al. | |
| 2021/0373899 A1 | 12/2021 | Vembu et al. | |

OTHER PUBLICATIONS

Anonymous: ""RDNA 2" Instruction Set Architecture", Nov. 30, 2020, pp. 1-291, XP093291077, Retrieved from the Internet: URL:https://www.amd.com/content/dam/amd/en/documents/radeon-tech-docs/instructions-set-architectures/rdna2-shader-instructions-set-architecture.pdf [retrieved on Jul. 1, 2025] p. 4-p. 11; figure 1 Section 3.6.5; p. 18 figure 2; table 29.

* cited by examiner

100A

100B

200

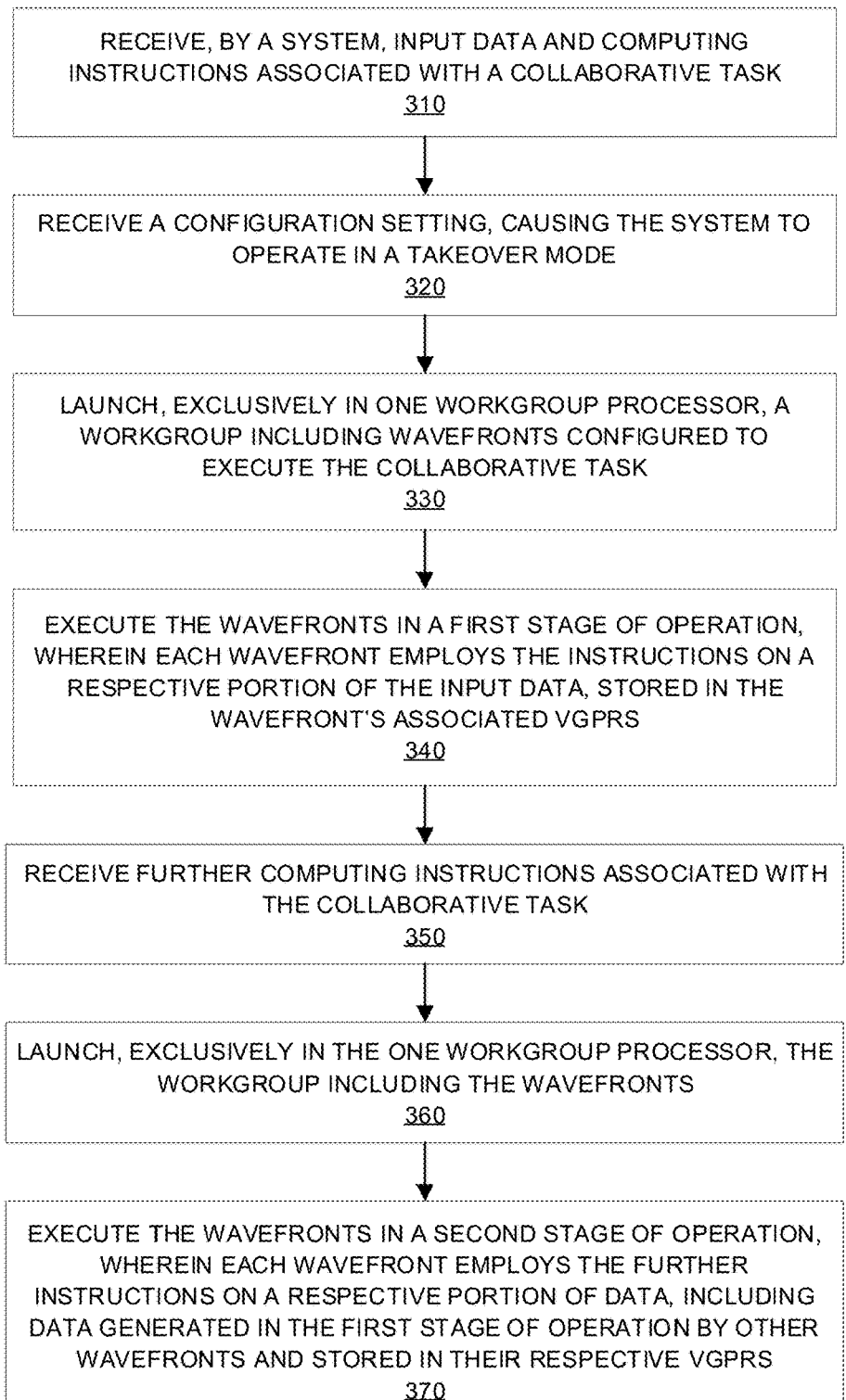

RECEIVE, BY A SYSTEM, INPUT DATA AND COMPUTING
INSTRUCTIONS ASSOCIATED WITH A COLLABORATIVE TASK
310

RECEIVE A CONFIGURATION SETTING, CAUSING THE SYSTEM TO
OPERATE IN A TAKEOVER MODE
320

LAUNCH, EXCLUSIVELY IN ONE WORKGROUP PROCESSOR, A
WORKGROUP INCLUDING WAVEFRONTS CONFIGURED TO
EXECUTE THE COLLABORATIVE TASK
330

EXECUTE THE WAVEFRONTS IN A FIRST STAGE OF OPERATION,
WHEREIN EACH WAVEFRONT EMPLOYS THE INSTRUCTIONS ON A
RESPECTIVE PORTION OF THE INPUT DATA, STORED IN THE
WAVEFRONT'S ASSOCIATED VGPRS
340

RECEIVE FURTHER COMPUTING INSTRUCTIONS ASSOCIATED WITH
THE COLLABORATIVE TASK
350

LAUNCH, EXCLUSIVELY IN THE ONE WORKGROUP PROCESSOR, THE
WORKGROUP INCLUDING THE WAVEFRONTS
360

EXECUTE THE WAVEFRONTS IN A SECOND STAGE OF OPERATION,
WHEREIN EACH WAVEFRONT EMPLOYS THE FURTHER
INSTRUCTIONS ON A RESPECTIVE PORTION OF DATA, INCLUDING
DATA GENERATED IN THE FIRST STAGE OF OPERATION BY OTHER
WAVEFRONTS AND STORED IN THEIR RESPECTIVE VGPRS
370

FIG. 3
300

SYSTEM AND METHOD FOR EXECUTING A TASK

CROSS REFERENCE TO RELATED APPLICATIONS

This application is a continuation of U.S. patent application Ser. No. 17/489,724, filed Sep. 29, 2021, which is incorporated by reference as if fully set forth.

BACKGROUND

A shader system typically includes a large number of shader cores that are grouped into processing units. Each of these processing units can include several shader cores and memory resources. Normally, multiple unrelated wavefronts (shader programs) can run concurrently in each of the shader cores. Therefore, mechanisms exist to secure the data owned by each wavefront, to make sure, for example, that one wavefront cannot access the memory allocated for the operation of another wavefront. However, such mechanisms are not without cost. For example, if one wavefront has to operate based on data (or controls) generated by a second wavefront, the latter has to write the data into a shared memory and the former has to read the data from the shared memory. Such memory accesses are time consuming. Moreover, when the shader system is used for a collaborative task, to be performed by multiple wavefronts, time consuming mechanisms to secure data owned by each of the wavefronts are unnecessary. Techniques are needed to enable efficient processing of collaborative tasks carried out by multiple wavefronts.

BRIEF DESCRIPTION OF THE DRAWINGS

A more detailed understanding may be had from the following description, given by way of example in conjunction with the accompanying drawings wherein:

FIG. 3 is a flow chart of an example method for processing a collaborative task, based on which one or more features of the disclosure can be implemented.

DETAILED DESCRIPTION

Figure 1A:
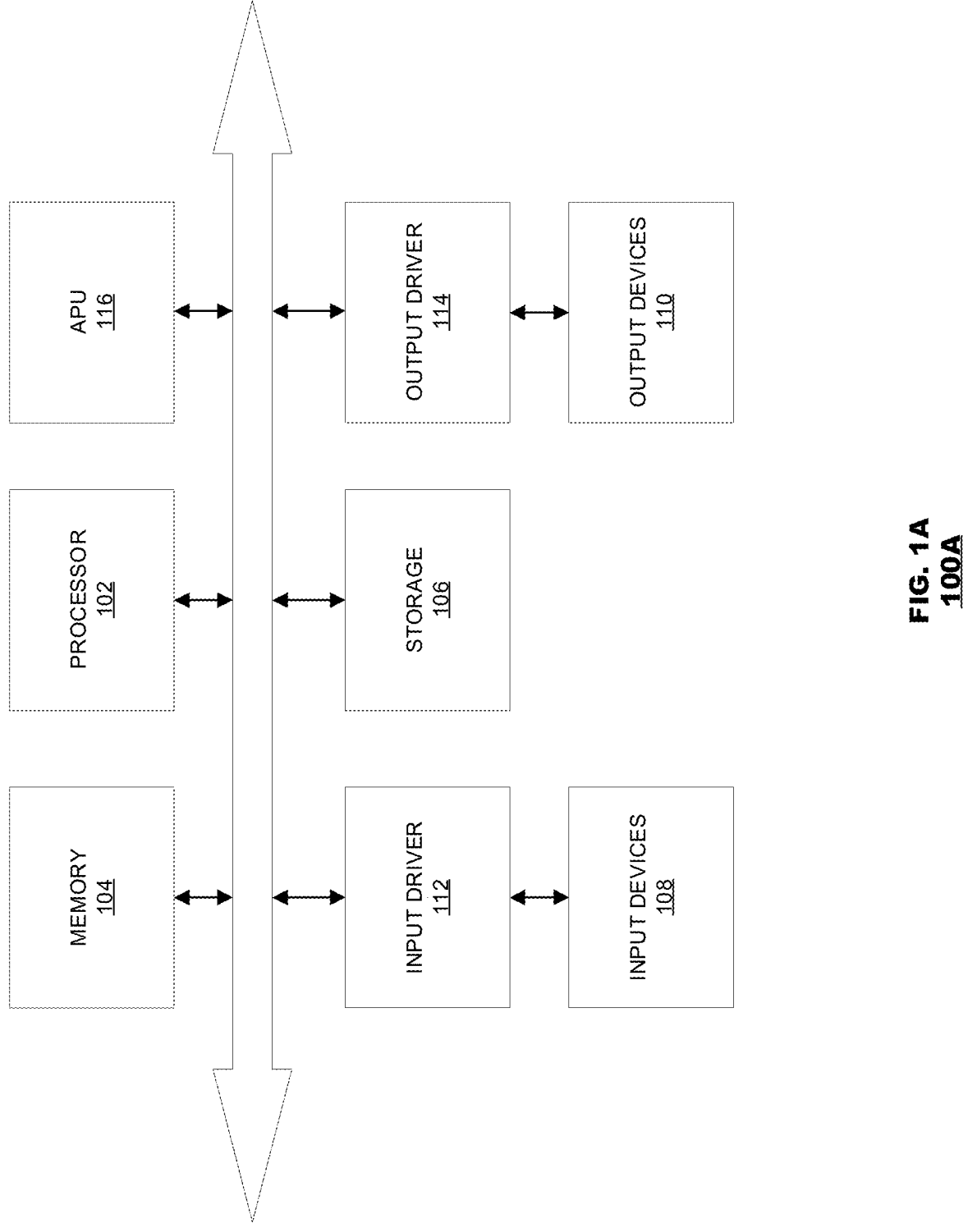
FIG. 1A is a block diagram of an example device, based on which one or more features of the disclosure can be implemented.

System and methods are disclosed in the present application for efficient processing of collaborative tasks in a shader system. A new mode of operation, namely a workgroup processor takeover mode (or a takeover mode), is introduced, in which wavefronts, launched to perform a collaborative task, are exclusively executed in a processing unit of the shader system, referred to herein as a workgroup processor (WGP). In this mode, the hardware resources of the WGP are shared among the wavefronts that execute on the WGP to perform the collaborative task (e.g., the wavefronts have global access to the WGP's memory resources, such as vector general purpose registers (VGPRs) and local data share (LDS) memory).

In an aspect, the present disclosure describes methods for executing a collaborative task in a shader system. The methods can comprise receiving, by the system, input data and computing instructions associated with the task; receiving, by the system, a configuration setting, causing the system to operate in a takeover mode; and launching, by the system, exclusively in one WGP, a workgroup including wavefronts configured to execute the collaborative task. The methods can further comprise executing, by the system, the wavefronts in a first stage of operation, wherein each wavefront employs the computing instructions on a respective portion of the input data, stored in VGPRs associated with the wavefront. When the executing of the wavefronts is completed, the methods can also comprise receiving, by the system, further computing instructions associated with the task; launching, by the system, exclusively in the one WGP, the workgroup including the wavefronts; and executing, by the system, the wavefronts in a second stage of operation, wherein each wavefront employs the further computing instructions on a respective portion of data, including data generated in the first stage of operation by other wavefronts in the workgroup that are stored in VGPRs associated with the other wavefronts.

In another aspect, the present disclosure describes shader systems for executing a collaborative task. The systems comprise at least one processor and memory storing instructions. The instructions, when executed by the at least one processor, can cause the systems to receive input data and computing instructions associated with the task, receive a configuration setting, causing the systems to operate in a takeover mode, and launch, exclusively in one WGP, a workgroup including wavefronts configured to execute the collaborative task. The instructions can further cause the systems to execute the wavefronts in a first stage of operation, wherein each wavefront employs the computing instructions on a respective portion of the input data, stored in VGPRs associated with the wavefront. When the executing of the wavefronts is completed, the instructions can also cause the systems to receive further computing instructions associated with the task, launch, exclusively in the one WGP, the workgroup including the wavefronts, and execute the wavefronts in a second stage of operation, wherein each wavefront employs the further computing instructions on a respective portion of data, including data generated in the first stage of operation by other wavefronts in the workgroup that are stored in VGPRs associated with the other wavefronts.

In yet another aspect, the present disclosure describes non-transitory computer-readable mediums comprising instructions executable by at least one processor to perform methods for executing a collaborative task in shader systems. The methods comprise receiving, by the system, input data and computing instructions associated with the task; receiving, by the system, a configuration setting, causing the system to operate in a takeover mode; and launching, by the system, exclusively in one WGP, a workgroup including wavefronts configured to execute the collaborative task. The methods further comprise executing, by the system, the wavefronts in a first stage of operation, wherein each wavefront employs the computing instructions on a respective portion of the input data, stored in VGPRs associated with the wavefront. When the executing of the wavefronts is completed, the methods also comprise receiving, by the system, further computing instructions associated with the task; launching, by the system, exclusively in the one WGP, the workgroup including the wavefronts; and executing, by the system, the wavefronts in a second stage of operation, wherein each wavefront employs the further computing instructions on a respective portion of data, including data generated in the first stage of operation by other wavefronts in the workgroup that are stored in VGPRs associated with the other wavefronts.

FIG. 1A is a block diagram of an example device 100A, based on which one or more features of the disclosure can be implemented. The device 100A can be, for example, a computer, a gaming device, a handheld device, a set-top box, a television, a mobile phone, or a tablet computer. The device 100A includes a processor 102, an accelerated processing unit (APU) 116, memory 104, storage 106, one or more input devices 108, and one or more output devices 110. The device 100A can also include an input driver 112 and an output driver 114. In an aspect, the device 100A can include additional components not shown in FIG. 1.

The processor 102 can include a central processing unit (CPU) or one or more cores of CPUs. The APU 116, representing a shader system or graphics processing unit (GPU), can include one or more cores of APUs. The processor 102 and the APU 116 may be located on the same die or on separate dies. The memory 104 can be located on the same die as the processor 102, or can be located separately from the processor 102. The memory 104 can include volatile or non-volatile memory, for example, random access memory (RAM), dynamic RAM, a cache, or a combination thereof.

The storage 106 can include fixed or removable storage, for example, a hard disk drive, a solid-state drive, an optical disk, or a flash drive. The input devices 108 can include, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output devices 110 can include, for example, a display, a speaker, a printer, a haptic feedback device, one or more lights, an antenna, or a network connection (e.g., a wireless local area network card for transmission of wireless IEEE 802 signals).

The input driver 112 communicates with the processor 102 and the input devices 108, and facilitates the receiving of input from the input devices 108 to the processor 102. The output driver 114 communicates with the processor 102 and the output devices 110, and facilitates the sending of output from the processor 102 to the output devices 110. In an aspect, the input driver 112 and the output driver 114 are optional components, and the device 100A can operate in the same manner when the input driver 112 and the output driver 114 are not present.

The APU 116 can be configured to accept compute commands and graphics rendering commands from processor 102, to process those compute and graphics rendering commands, and/or to provide output to a display (output device 110). As described in further detail below, the APU 116 can include one or more parallel processing units configured to perform computations, for example, in accordance with a single instruction multiple data (SIMD) paradigm. Thus, although various functionality is described herein as being performed by or in conjunction with the APU 116, in various alternatives, the functionality described as being performed by the APU 116 can be additionally or alternatively performed by other computing devices having similar capabilities that are not driven by a host processor (e.g., processor 102) and that can be configured to provide, for example, graphical output to a display. Whether or not a processing system can perform processing tasks in accordance with a SIMD paradigm, the processing system can be configured to perform the functionality described herein.

Figure 1B:
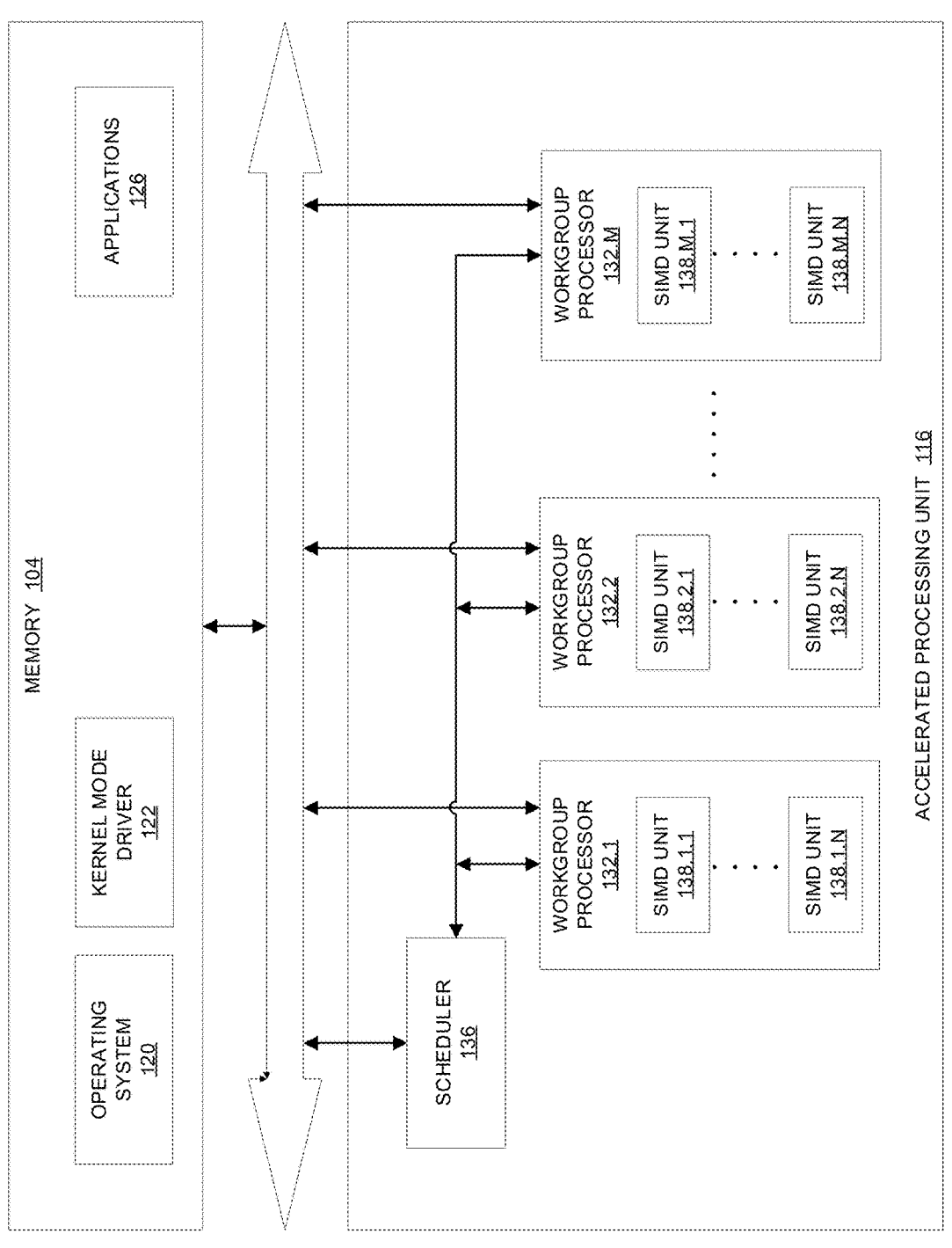
FIG. 1B is a block diagram of an example system, demonstrating a shader system employable by the device of FIG. 1A, based on which one or more features of the disclosure can be implemented.

FIG. 1B is a block diagram of an example system 100B, demonstrating a shader system employable by the device of FIG. 1A, based on which one or more features of the disclosure can be implemented. FIG. 1B illustrates in further detail the execution of processing tasks on APU 116. The processor 102 can maintain in memory 104 one or more modules for execution by the processor 102. The modules include an operating system 120, a kernel mode driver 122, and applications 126. These modules can control various features of the operation of the processor 102 and the APU 116. For example, the operating system 120 can provide system calls, that is, application programming interfaces (APIs), that can be employed by applications 126 to directly interface with the hardware. The kernel mode driver 122 can control operation of the APU 116 by, for example, providing APIs to applications 126 executing on the processor 102 to access various functionality of the APU 116. The kernel mode driver 122 can also include a just-in-time compiler that compiles programs for execution by processing components of the APU 116 (such as the SIMD units 138 discussed in further detail below).

The APU 116 can execute commands and programs for graphics operations and non-graphics operations, including either parallel processing or sequential processing and either ordered or non-ordered processing. The APU 116 can be used for executing graphics pipeline operations-such as operations that process pixels and/or geometric computations (e.g., rendering an image to the display (output device 110))-based on commands received from the processor 102. The APU 116 can also execute processing operations that are not related to graphics operations, such as operations related to video, physics simulations, computational fluid dynamics, or other tasks, based on commands received from the processor 102.

The APU 116 can include WGPs 132.1-M; each WGP, e.g., 132.1, can have one or more SIMD units, e.g., 138.1.1-N, that can perform operations at the request of the processor 102 in a parallel manner according to a SIMD paradigm. The SIMD paradigm is one in which multiple processing elements share a single program control flow unit and program counter, and, thus, can execute the same program but on different data. In one example, each SIMD unit, e.g., 138.1.1, can run 64 lanes (i.e., threads), where each lane executes the same instruction at the same time as the other lanes in the SIMD unit, but executes that instruction on different data. Lanes can be switched off with predication, such as when not all the lanes are needed to execute a given instruction. Predication can also be used to execute programs with divergent control flows. Specifically, for programs with conditional branches or other instructions where control flow is based on calculations performed by an individual lane, predication of lanes corresponding to control flow paths not currently being executed (and serial execution of different control flow paths) allows for arbitrary control flow. In an aspect, each of the WGPs 132.1-M can have a local cache. In another aspect, multiple WGPs can share a cache.

The basic unit of execution in a WGP, e.g., 132.1, is a work-item. Typically, each work-item represents a single instantiation of a program that can be executed in parallel in a particular lane. Work-items can be executed simultaneously as a "wavefront" (or a "wave") on a single SIMD, e.g., 138.1.1. One or more waves can be run in a workgroup, each wave including a collection of work-items designated to execute the same program. A workgroup is executed by executing each of the waves that make up the workgroup. The waves can also be executed sequentially on a single SIMD unit or partially or fully in parallel on different SIMD units, 138.1-N. Thus, a wave can be thought of as a collection of work-items that can be executed simultaneously on a single SIMD unit e.g., 138.1.1. Thus, if commands received from the processor 102 indicate that a particular program is to be parallelized to such a degree that the program cannot be executed on a single SIMD unit simultaneously, then that program can be broken up into waves which can be parallelized on two or more SIMD units (e.g., 138.1.1-N), serialized on the same SIMD unit (e.g., 138.1.1.), or both parallelized and serialized as needed. A scheduler 136 can be configured to perform operations related to launching various waves on the different WGPs 132.1-M and their respective SIMD units.

The parallelism afforded by the WGPs 132.1-M is suitable, for example, for graphics-related operations such as operations on pixel values (e.g., filter operations), operations on geometrical data (e.g., vertex transformations), and other graphics related operations. For example, an application 126, executing on the processor 102, can involve computations to be performed by the APU 116. The application 126 can use APIs provided by the kernel mode driver 122 to issue processing commands to the APU 116. The processing commands are then provided to the scheduler 136. The scheduler 136 translates the processing commands into computation tasks that are assigned to the WGPs 132.1-M for execution in parallel. For example, the scheduler 136 may receive a processing command that includes instructions to be perform on data (e.g., 1024 pixels of an image). In response, the scheduler 136 can chunk the data into groups (e.g., each group containing data required for the processing of 64 pixels) and launch waves in one or more WGPs, each wave associated with a group of data and instructions to perform on the data. For example, the scheduler 136 may launch 16 waves (e.g., each in charge of processing 64 pixels) to be executed in SIMDs 138 of one or more WGPs 132.

Figure 2:
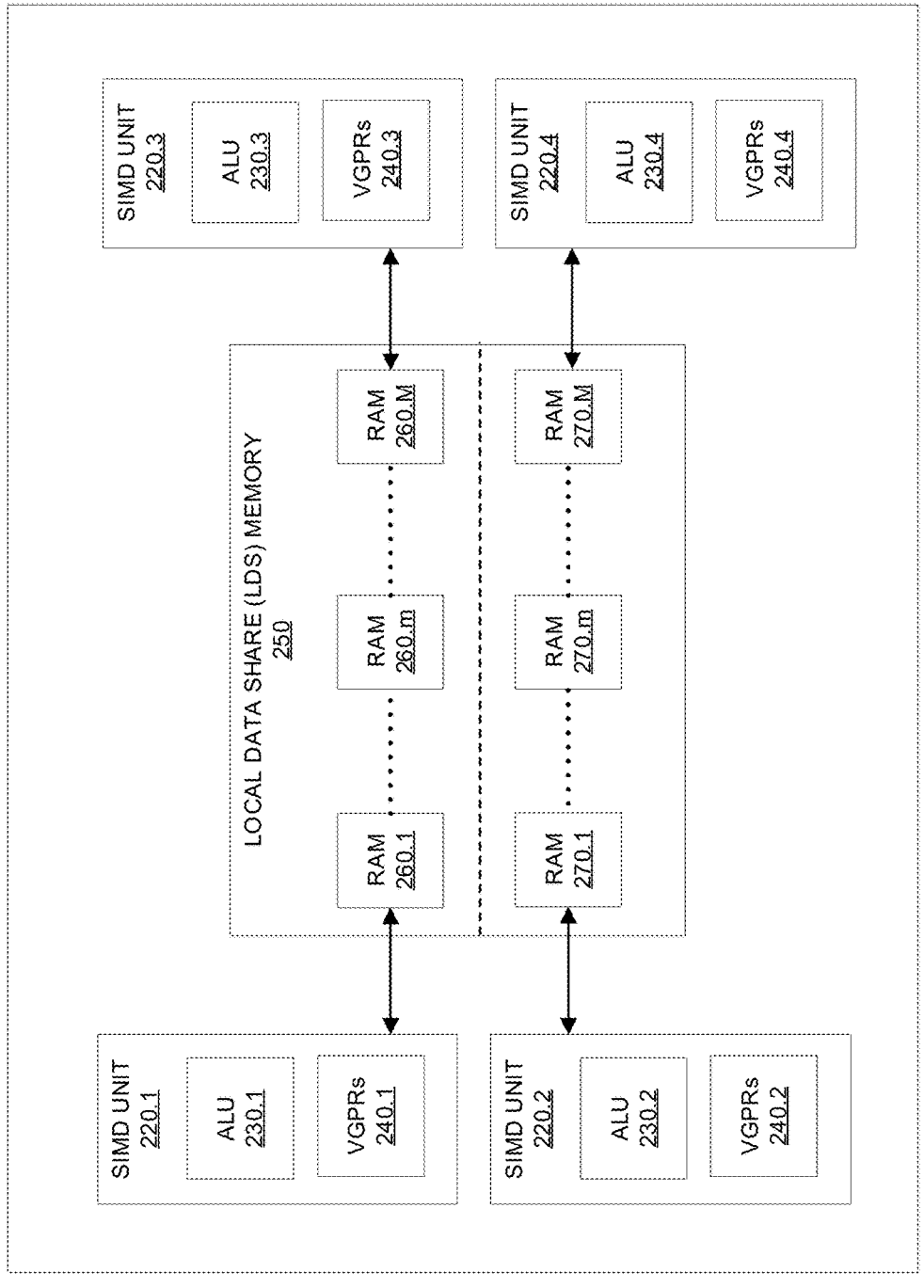
FIG. 2 is a block diagram of an example workgroup processor (WGP), based on which one or more features of the disclosure can be implemented.

FIG. 2 is a block diagram of an example WGP 200, based on which one or more features of the disclosure can be implemented. The WGP 200 can be one of the WGPs 132.1-M of the APU 116 of FIG. 1B. The WGP 200 can include SIMD units 220.1-4 and LDS memory 250. Each SIMD, e.g., 220.1, includes an arithmetic logic unit (ALU) 230.1 and VGPRs 240.1. The ALUs 230.1-4 contain circuits designed to perform computations specified by shader instructions executed on respective SIMD 220.1-4. The VGPRs 240.1-4 are registers that respective SIMDs 220.1-4 can use to store (input and output) data that the shader instructions operate on. The LDS memory 250 is a memory resource accessible by the SIMD units 220.1-4. In an aspect, the LDS memory 250 contains RAMs (or any other type of volatile memory units) arranged in two arrays, including a top array of RAMs 260.1-M and a bottom array of RAMs 270.1-M.

In a normal mode of operation of a shader system (such as the APU 116 of FIG. 1B), when a scheduler 136 has to launch a wave, it first checks the resource availability of the WGPs 132.1-M in the system 116. For example, the scheduler checks the number of waves that are running in a WGP relative to the maximum number of waves that that WGP can execute concurrently. The scheduler then launches the wave in a WGP with a current capacity to run it. As each wave is an independent program, in the normal mode, a wave that was launched in one of the WGP cannot access data processed by another wave. Protecting data processed by one wave from being accessed by another wave is an important system feature designed to provide security measures. However, this data security system feature needs to be controlled when waves are employed to perform a collaborative task wherein sharing data among the waves is required for efficiently performing the task in a context that do not present data security concerns.

Hence, a mode of operation, namely a takeover mode, is disclosed herein. In a takeover mode, an operation configuration is activated that deviate from the normal mode of operation. That is, hardware limitations, that are designed to protect one wave from interacting with another wave's data in a normal mode of operation, are lifted. In a takeover mode, waves that are designed to perform a collaborative task run exclusively on one WGP 200 and efficiently use that WGP's resources. For example, when a group of waves, e.g., a workgroup of 16 waves, is to perform a collaborative task, a takeover mode can be set. In this mode, the scheduler 136 of the system is configured to launch this workgroup on one WGP, and no other wave will be launched on that WGP before all the waves in the workgroup conclude their execution. Otherwise, if the scheduler launches an unrelated wave, the global access to memory resources of the WGP granted by the takeover mode may cause a security hazard; that is, protected data generated by the unrelated wave may be accessed by another wave in the workgroup and vice versa. Thus, in a takeover mode, all unrelated waves are drained from the WGP before the waves of the workgroup are launched exclusively on the WGP, and all waves of the workgroup are drained from the WGP before other unrelated waves can be launched.

Waves in a workgroup that run in a takeover mode can enjoy global access to the memory resources of the WGP 200 such as the VGPRs 240.1-4. This global access to the VGPRs 240.1-4 is secure because the only waves that concurrently run in the WGP 200 are those of the workgroup-no other unrelated wave can concurrently run in this mode and interact with (read or write into) the data in the VGPRs that are processed (owned) by the waves of the workgroup. Hence, a takeover mode sets the shader system (e.g., APU 116) into a configuration in which waves can directly reach into each other's data (stored in respective VGPRs 240.1-4) to share the results of their computations. Thus, in a takeover mode, waves can access global VGPRs within the same SIMD. In contrast, in a normal mode, in order to share data between waves, the data have to be first saved into a shared memory by one wave before another wave can read it-a slow and expensive process.

Thus, global access to VGPRs 240.1-4 by waves that perform a related task allows the waves to use each other processing results. Tasks that involve processing data in parallel and in stages can benefit from the takeover mode, as, typically, waves that run in one stage use the processing results of waves that run in a previous stage. For example, a convolutional neural network (CNN) processes data in layers (stages), wherein one layer uses the resulting processed data of a previous layer. For example, when operating in a takeover mode, a workgroup of 16 waves may be launched by the scheduler 136 exclusively in one WGP 200 (e.g., WGP 132.1) to perform a computational task requires by a CNN's layer. In such a case, four waves can be executed in each of the SIMD units 220.1-4. A register block of 256 bytes can be assigned to each of these waves. That is, a wave executing on SIMD unit 220.1 can have allocated for its use 256 bytes of VGPRs 240.1. That wave can store data it needs to operate on and the resulting data of that operation in its assigned register block. However, sometimes, the wave requires operating on data that resulted from the operation of waves in a previous layer of the CNN. In such a case, that wave needs to access register blocks assigned to those waves in their respective SIMDs. Without this global access, enabled by the takeover mode (that is, in a normal mode), waves operating in one layer of the CNN would have to save their resulting data in a share memory so that waves operating in the next layer will be able to load those data into their assigned register blocks before operating on those data.

In addition to global access to VGPRs afforded by the takeover mode, the SIMD units 220.1-4 can have access to all regions of the LDS memory 250, from which memory space may be allocated. In a takeover mode, a memory allocation policy is used in which all waves of the workgroup can receive symmetric access to memory space in the LDS memory 250. In a normal operation mode, for example, SIMD unit 220.1 may have access limited to memory space within RAM 260.1 and SIMD 220.3 may have access limited to memory space within RAM 270.1. Due to the physical arrangement of these RAMs, 260.1 and 270.1, within the LDS memory 250 relative to the SIMD units 220.1 and 220.3, an asymmetry may result in terms of access efficiency between these two SIMD units, 220.1 and 220.3. In contrast, in a takeover mode, the SIMD units can all access the entire memory within the LDS 250. For example, SIMD units 220.1, 220.2, 220.3, and 220.4 can allocate and access, respectively, memory space within RAM 260.1, 270.1, 260.M, and 270.M. Due to these RAMs' physical arrangement within the LDS memory 250, an equal (or symmetric) access efficiency to all the SIMD units (and thereby the waves they run) is enabled.

FIG. 3 is a flow chart of an example method 300 for processing a collaborative task, based on which one or more features of the disclosure can be implemented. In an aspect, the method 300 can be employed by the shader system of FIG. 1B.

The method 300 can begin in step 310, where input data and computing instructions associated with a collaborative task can be received by the system. In addition, a configuration setting of a takeover mode can be received in step 320, causing the system to switch operation from a normal mode into a takeover mode.

In the takeover mode, in step 330, a workgroup including wavefronts configured to execute the collaborative task can be launched exclusively in one WGP. The launched wavefronts, in step 340, can be executed in a first stage of operation, each executing wavefront employs the received instructions on a respective portion of the input data that are stored in its associated VGPRs. Then, when the execution of the wavefronts is completed, in step 350, further computing instructions associated with the task can be received by the system.

In response, in step 360, the workgroup including the wavefronts are launched again exclusively in the one WGP. The launched wavefronts, in step 370, can be executed in a second stage of operation, each executing wavefront employs the received further instructions on a respective portion of data, including data generated in the first stage of operation by other wavefronts in the workgroup that are stored in the other wavefronts' associated VGPRs. As mentioned before, the first stage of operation may be computations performed in a first layer of a CNN and the second stage of operation may be computations performed in a second layer of the CNN.

In an aspect, the caches of a WGP may be managed according to different policies when the WGP operates in a takeover mode. For example, as collaborative tasks are associated with a typical workload pattern, cache management policies may be selected in accordance with that workload pattern. Thus, cache management policies that are configurable are useful. This can be done by dynamically setting a configuration register of a WGP when operating in a takeover mode. In an aspect, instruction cache set/bank (identity) hashing can be automatically set upon entering a takeover mode and automatically reset upon exiting a takeover mode.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of non-transitory computer-readable storage mediums include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing a task comprising:
   receiving, by a system, input data and computing instructions associated with the task;
   launching, by the system, a workgroup including wavefronts to execute the task in a workgroup processor (WGP), wherein the launching of the workgroup causes the wavefronts to process the input data by sharing intermediate results and resources; and
   adjusting, by the system, an operation of the WGP based on characteristics of the wavefronts.

2. The method of claim 1, wherein the characteristics of the wavefronts include any one or a combination of: data dependencies, computational load, memory usage, and execution timing requirements.

3. The method of claim 1, wherein the wavefronts are executed in stages of operation and each wavefront uses the computing instructions on a portion of the input data and data generated by other wavefronts.

4. The method of claim 3, wherein in a first stage of operation, each wavefront processes a portion of the input data using the computing instructions to generate data, and the operation of the WGP is adjusted based on the characteristics of the wavefronts.

5. The method of claim 4, wherein in a second stage of operation, each wavefront processes the generated data in the first stage of operation using computing instructions associated with the task, and the operation of the WGP is further adjusted based on the characteristics of the wavefronts.

6. The method of claim 1, wherein a wavefront of the workgroup has access to memory resources that are associated with at least one other wavefront of the workgroup.

7. The method of claim 1, wherein memory resources of the WGP enable symmetric memory access for wavefronts of the workgroup.

8. The method of claim 1, further comprising activating, by the system, a cache management policy for the WGP based on a workload pattern of the task.

9. The method of claim 1, wherein the WGP comprises one or more single instruction multiple data (SIMD) units where each unit is used to execute a subset of the wavefronts.

10. A system comprising:

a processor;

a work group processor (WGP); and a memory configured to store instructions that, when executed by the processor, cause the system to:

receive input data and computing instructions associated with a task;

launch a workgroup including wavefronts to execute the task in the WGP, wherein the launching of the workgroup causes the wavefronts to process the input data by sharing intermediate results and resources; and adjust an operation of the WGP based on characteristics of the wavefronts.

11. The system of claim 10, wherein the characteristics of the wavefronts include any one or a combination of: data dependencies, computational load, memory usage, and execution timing requirements.

12. The system of claim 10, wherein the wavefronts are executed in stages of operation and each wavefront uses the computing instructions on a portion of the input data and data generated by other wavefronts.

13. The system of claim 12, wherein in a first stage of operation, each wavefront processes a portion of the input data using the computing instructions to generate data, and the operation of the WGP is adjusted based on the characteristics of the wavefronts.

14. The system of claim 13, wherein in a second stage of operation, each wavefront processes the generated data in the first stage of operation using computing instructions associated with the task, and the operation of the WGP is further adjusted based on the characteristics of the wavefronts.

15. The system of claim 10, wherein a wavefront of the workgroup has access to memory resources that are associated with at least one other wavefront of the workgroup.

16. The system of claim 10, wherein memory resources of the WGP enable symmetric memory access for wavefronts of the workgroup.

17. The system of claim 10, wherein the WGP comprises any one or a combination of the following resources: vector general purpose registers (VGPRs); and local data share (LDS) memory.

18. The system of claim 10, wherein the WGP comprises one or more single instruction multiple data (SIMD) units where each unit is used to execute a subset of the wavefronts.

19. A non-transitory computer readable medium comprising instructions that, when executed by a processor, cause the processor to perform a method for executing a task comprising:

receiving, by a system, input data and computing instructions associated with the task;

launching, by the system, a workgroup including wavefronts to execute the task in a workgroup processor (WGP), wherein the launching of the workgroup causes the wavefronts to process the input data by sharing intermediate results and resources; and adjusting, by the system, an operation of the WGP based on characteristics of the wavefronts.

20. The non-transitory computer readable medium of claim 19, wherein the characteristics of the wavefronts include any one or a combination of: data dependencies, computational load, memory usage, and execution timing requirements.

* * * * *